C. M. FLINT.
Wagon Brake.

No. 82,611.    Patented Sept. 29, 1868.

Witnesses
S. N. Piper.
J. R. Snow.

Inventor.
Charles M. Flint
by his attorney
R. H. Eddy

United States Patent Office.

CHARLES M. FLINT, OF HANCOCK, NEW HAMPSHIRE.

Letters Patent No. 82,611, dated September 29, 1868.

IMPROVEMENT IN WAGON-BRAKE.

The Schedule referred to in these Letters Patent and making part of the same.

TO ALL PERSONS TO WHOM THESE PRESENTS MAY COME:

Be it known that I, CHARLES M. FLINT, of Hancock, of the county of Hillsborough, of the State of New Hampshire, have invented a new and useful Improvement in Brakes for Wagons, &c.; and I do hereby declare the same to be fully described in the following specification, and represented in the accompanying drawings, of which—

Figure 1:
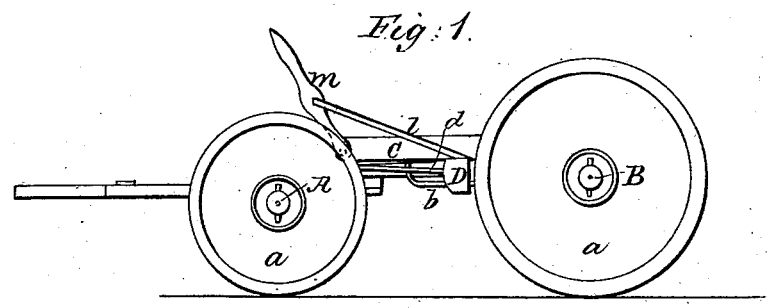
Figure 2:
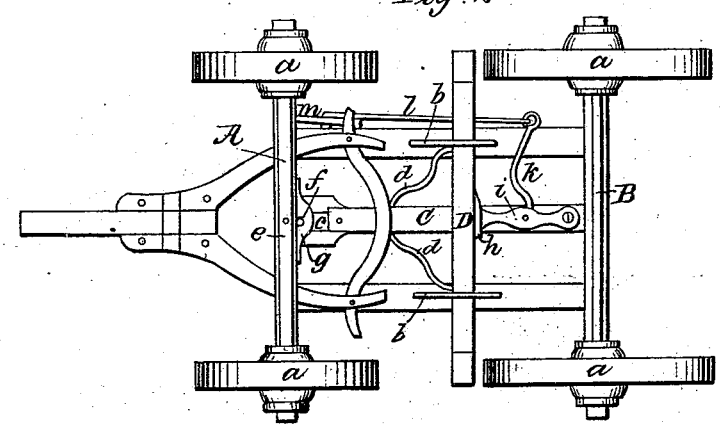
Figure 3:
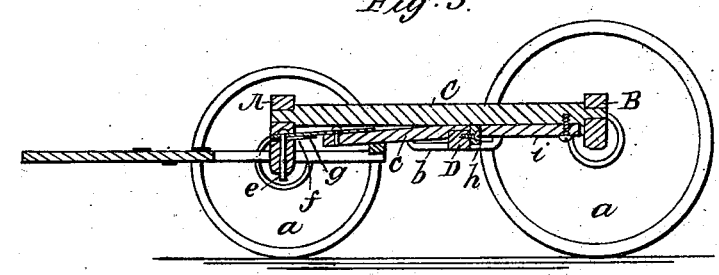

Figure 1 is a side elevation,
Figure 2 an under side view, and
Figure 3 a longitudinal section of a wagon-perch, axle, and wheels, as provided with my invention, applied to the brake.

My improvement has reference to that kind of brake which is forced against the wheels by the back-pressure of the draught-animals and the gravitating-power of the carriage-body.

In the drawings, A denotes the front axle, and B the rear axle, and C the perch of a common four-wheeled carriage or wagon, the wheels being shown at $a\ a\ a\ a$.

The brake is shown at D as arranged underneath the perch and in front of the peripheries of the rear wheels. This brake is supported by staples, $b\ b$, and has an arm, $c$, extended from its middle, such arm and brake being provided with lateral braces, $d\ d$. The said arm supports the king-bolt $e$, which goes down through it and a slot, $f$, made in a plate, $g$, fixed to the under side of the front bar of the perch. The plate $g$ rests directly on the front axle, and the king-bolt goes down into or through the said axle.

An inclined plane or cam, $h$, is fixed against the rear side and at the middle of the brake. This plane or cam operates with a toggle, $i$, which has an arm, $k$, extended from it, and is pivoted to the under side of the perch in manner as represented in the drawings. A connecting-rod, $l$, jointed to the arm, extends to a lever, $m$, pivoted to the side of the perch, and arranged therewith in manner as shown in the drawings.

By moving the lever backward, the toggle will be moved away from the inclined plane, so as to allow the brake to be forced back against the rear wheels, when the forward axle may be moved backward relatively to the perch, or the latter advanced by the load with respect to the said axle. The toggle and inclined plane, however, serve to hold the brake out of action on the wheels, as well as to graduate its pressure thereon.

The slotted plate $g$ serves as a stop to arrest the forward movement of the brake, and to connect the king-bolt with the perch.

I make no claim to the application of a brake to the wheels and tongue of a carriage, so as to be forced back against the wheels by the draught-animal or animals, or by the advance of the carriage-body, while the wheels may be held back by the draught-animal or animals.

What I claim as my invention is as follows:

I claim the arrangement of the brake-arm $c$ and the slotted plate $g$ with the king-bolt, the front axle, and the front bar of the perch, the whole being substantially as specified.

CHARLES M. FLINT.

Witnesses:
R. H. EDDY,
F. P. HALE, Jr.